United States Patent [19]
Ramsbro

[11] Patent Number: 4,786,776
[45] Date of Patent: Nov. 22, 1988

[54] HOLDING AND REFERENCE SYSTEM FOR A WIRE SPARK-EROSION MACHINE

[75] Inventor: Börje Ramsbro, Djursholm, Sweden

[73] Assignee: System 3R International AB, Vallingby, Sweden

[21] Appl. No.: 865,136

[22] Filed: May 20, 1986

[30] Foreign Application Priority Data

May 21, 1985 [SE] Sweden .................. 8502488
Apr. 10, 1986 [EP] European Pat. Off. .......... 86104898

[51] Int. Cl.⁴ .................... B23H 7/02; B23Q 3/02
[52] U.S. Cl. ..................... 219/69 R; 219/69 W; 269/309
[58] Field of Search .............. 219/68, 69 R, 69 W, 219/69 E; 269/303, 309, 900, 311, 289 R, 296–298; 83/466.1, 467 R; 51/216 R, 217 R; 204/206, 224 M, 297 R

[56] References Cited

U.S. PATENT DOCUMENTS

| | | | |
|---|---|---|---|
| 2,415,259 | 2/1947 | Renton | 269/900 |
| 3,606,300 | 9/1971 | Davis | 269/309 |
| 3,622,145 | 11/1971 | Gibson | 269/297 |
| 3,777,602 | 12/1973 | Youra | 269/297 |
| 4,184,669 | 1/1980 | Bald | 269/309 |
| 4,227,064 | 10/1980 | Muegge et al. | 219/69 W |
| 4,518,155 | 5/1985 | Lehmann | 269/309 |
| 4,577,846 | 3/1986 | Büchler | 269/82 |
| 4,603,391 | 7/1986 | Inoue et al. | 219/69 W |
| 4,631,382 | 12/1986 | Fukunaga et al. | 219/69 R |

FOREIGN PATENT DOCUMENTS

| | | | |
|---|---|---|---|
| 149429 | 7/1985 | European Pat. Off. | 219/69 R |
| 158859 | 10/1985 | European Pat. Off. | 219/69 R |
| 2646951 | 4/1978 | Fed. Rep. of Germany. | |
| 213419 | 10/1985 | Japan | 219/69 R |

OTHER PUBLICATIONS

"Werkstattstchnick, Zeitschrift fuer Industrielle Fertigung", Apr. 1984, by H. Ahuis.

Primary Examiner—A. D. Pellinen
Assistant Examiner—Geoffrey S. Evans
Attorney, Agent, or Firm—Holman & Stern

[57] ABSTRACT

A reference piece (30) for positioning a workpiece in a prescribed operational position, within the working zone (10) of a wire spark-erosion machine, relative to the cutting wire (8) of the machine, has associated with it at least one planar base reference surface (20, 22) formed on the mounting table (2) of the machine, outside the working zone, which base reference surface extends in an x-direction and in a y-direction perpendicular to the x-direction, and extends at the level, or in a plane, of the lower limit line (9) (base line) of the working zone with regard to a z-direction normal to the x- and y-directions. In order to provide an accurate geometric reference system in the vicinity of the working zone, for reproducible positioning of a workpiece, which system can be employed as a fixed starting value by the electronic control device of the machine, the reference piece (30) has a planar bottom surface (32) and is provided with a fastening device (42, 44, 46) for accurately affixing the piece by its bottom surface to the base reference surface (20, 22). The piece (30) further has a dovetail shaped cross-section and a planar oblique surface (39) which serves as a reference surface in the x-direction.

19 Claims, 7 Drawing Sheets

HOLDING AND REFERENCE SYSTEM FOR A WIRE SPARK-EROSION MACHINE

BACKGROUND OF THE INVENTION

1. Field of the Invention

The invention relates to a reference piece for exact positioning of a workpiece in a prescribed operational position within the working zone of a wire spark-erosion machine, relative to the cutting wire of the machine, wherein outside the working zone, at least one planar base reference surface is formed on the mounting table of the machine which base reference surface extends in an x-direction and in a y-direction perpendicular to said x-direction at the level, or in the plane, of the lower limit line (base line) of the working zone with regard to a z-direction normal to said x- and y-directions.

2. Description of the Prior Art

Wire spark-erosion machines generally comprise an upper wire feed mechanism and a lower wire withdrawal mechanism, between which the cutting wire extends through the working zone, the direction of the cutting wire being usually the z-direction which may be vertical.

In the wire spark-erosion machines for which the invention is applicable a base reference surface is provided on the mounting table, outside the working zone, which base reference surface is employed for exact positioning of the workpiece which is to be acted upon by the cutting wire in the working zone. This base reference surface provides a reference surface for positioning the workpiece in the z-direction. Said surface is commonly a planar-ground surface of a support member which member rises from the mounting table in the z-direction and extends parallel to a lateral boundary of the working zone. The support rises far enough over the mounting table for the base reference surface to lie on the base line of the working zone, namely on the lower boundary of the working zone closest to the mounting table in the z-direction. There are known wire spark-erosion machines in which for each opposite lateral boundary of the working zone a support member with a respective base reference surface is provided. Other wire spark-erosion machines are known in which the support member has an angle shape, so that the base reference surface at the base line extends along two adjoining lateral boundaries of the working zone.

Wire spark-erosion machining of a workpiece with a cutting wire enables shaped pieces to be produced having extremely high dimensional precision and surface quality. Wire spark-erosion machining takes a relatively long operating time. Therefore it is important to minimize unproductive time in the machine which time is consumed in changing and positioning workpieces. For die-sinking spark-erosion machines, mechanisms are known which are provided with reference surfaces, which enable a workpiece which is to be worked on to be mounted outside the machine on holders provided with counter-reference surfaces. Then, in order to mount a new workpiece in the die sinking spark-erosion machine one needs merely to attach the holders, upon which the workpiece has been mounted, to the machine. The workpiece then is automatically and accurately positioned by the interaction of the counter-reference surfaces of the holders with the reference surfaces of the mechanisms remaining on the machine as shown in Federal Republic of Germany Pat. No. 2,646,951.

The wire spark-erosion technique has enjoyed good market success, even though it is slow and requires substantial capital expenditure. Its rapid acceptance as a machining method is attributable to a number of favorable characteristics, which have opened new avenues for the manufacture of complex parts with stringent criteria of dimensional tolerances and surface quality.

Very complex two-dimensional shapes can be produced by wire spark-erosion machining with the aid of a thin wire which is controlled by a computerized numerical control ("CNC") system relative to the working zone. The machining can be performed on any electrically conducting workpiece, without producing attendant stress-increasing forces and without limiting the hardness of the workpiece.

These properties have enabled workpieces meeting stringent requirements for dimensional tolerances and surface quality to be produced with the same machinery as used in finishing, smoothing, planishing, etc. Advantageously, the workpiece can be hardened prior to the wire spark-erosion operation. Because the wire spark-erosion operation is controlled by CNC, which is well suited for extending unmanned operation, the disadvantages of slow machining speed and high machinery cost can be minimized by high utilization of the machines.

A precondition for high utilization of the machines is a wide range of applicability, with the entire geometric and load-bearing capacity of the machine being utilizable without time-consuming work.

Because the wire spark-erosion technique is particularly suited for short-run, i.e., not mass production, manufacture of parts in the nature of tooling or prototypes, it is uneconomical to fabricate special clamping devices to precisely position each shape of workpiece on the machine.

The dimensions, weights, and volumes of the workpieces will vary over a broad range. Accordingly, it is important for the productivity of the machine to be able to engage and position individual workpieces of different shapes and sizes with a minimum of downtime.

By employing a general, flexible reference system it is possible to carry out the basic positioning steps outside the machine itself, while the machine is performing another task. For this purpose, a basic reference system must be present on the machine, which system is fixed in relation to the active cutting wire of the machine. Secondary reference levels for accurately positioning the new workpiece in the working zone of the machine can be set up on, e.g., a faceplate, with the aid of this basic reference system, wherein the coordinates can be given with respect to the basic system ("offset coordinates") and can be transmitted to the control system of the wire spark-erosion machine in that form. The requirements which such a general reference system must meet are, however, very stringent.

The first requirement applied to a reference system, which requirement aims at maintaining high flexibility and thus high utilization of the wire spark-erosion machine, is that the system must enable workpieces of widely varying shapes and weights to be held and accurately positioned in the working zone, with the use of a limited number of generally usable elements. Any limitation of the original capacity of the machine with respect to geometry or weight will have a negative effect on utilization.

Because wire spark-erosion machines can machine complex geometries with stringent requirements for dimensional tolerances and surface quality, subsequent machining of workpieces is minimized or is completely obviated. Accordingly, despite low actual machining rates, the throughput time of a workpiece can be kept short by means of relatively long continuous unmanned operation. A prerequisite for such machining to final dimensions with close tolerances is that one be able to engage and fix the workpiece with a reference system which has high reproducibility and accuracy. In this connection, attention must be paid to the load-bearing capacity of the reference system, because elastic positional errors, e.g. due to elastic angular deviations, can themselves often exceed the prescribed dimensional tolerances for the finished workpiece.

As the need to machine conical surfaces at high cone angles becomes more frequent, the reference scale in the z-direction (vertical direction) of the machine becomes increasingly important with regard to the machining tolerance. A positional error of 0.02 mm in the z-direction gives rise to an error in the x-direction (which may be horizontal) of 0.01 mm when the cone angle is 30°, for example.

Further, with a general reference system economic aspects must be taken into account. For technically and economically feasible wire spark-erosion machining, the entire application range of the machine must be accessible with the use of a minimum number of reference elements. Modular construction, symmetry of design, and multiple applicability (multiple interchangeability) of the available reference elements all facilitate such technical and economic aspects. Because the electrodes employed in die-sinking spark-erosion machining can be advantageously manufactured on wire spark-erosion machines, compatibility of the auxiliary hardware of the two machines will also result in higher utilization of the available reference elements.

Moreover, wire spark-erosion and die-sinking spark-erosion machining are often carried out in processes involving several other machines. Accordingly, in order to achieve high utilization of available reference elements the reference elements should be capable of meeting the requirements of a number of machining processes, such as grindingm milling, turning, and facing, as well as wire spark-erosion and die-sinking spark-erosion, and should be easily capable of being measured on an ordinary faceplate. In addition, the base point references of the various machines should be capable of being coordinated with current CNC technology, which affords advances in programmed operation.

Examples of such a general auxiliary hardware system with reference levels fixed to the machine or adjustable outside the machine, which system does not limit the application range of the wire spark-erosion machine, are found in U.S. patent application Ser. No. 06/708,820, now U.S. Pat. No. 4,656,326.

There are also machines on the market which are provided with fixed base reference points on the z-axis and at angles "A" and "B", with such reference system not being applicable with general auxiliary hardware. The angle "A" is an angle in a plane which is perpendicular to the x-axis, and the angle "B" is an angle in a plane perpendicular to the y-axis. As a rule, these machines are equipped with a reference table in the form of a frame structure; or they may be equipped with an angle table or merely support rails which rails are disposed around the horizontal working zone of the machine and outside of said zone (see FIGS. 1 and 2).

These configurations use their upper limiting surface to define an accurate base reference surface in the vertical (z-axis) direction, as well as along angles "A" and "B". Invariably the base reference surface of the z-axis coincides with the lower limit of the vertical working zone of the machine, which lower limit is called the "base line". Accordingly, this base reference surface is employed as a direct support surface for large workpieces, and as an attachment surface for clamping means for such workpieces.

Another characteristic of these machines is that they lack usable base reference surfaces for the x- and y-axes; further, that there is no angle "C", which is an angle in a plane perpendicular to the z-axis.

On such machines, for each engagement of a workpiece the operator must find and fix the reference points on the x- and y-axes and along the angle "C", with the aid of electrical measuring devices provided on the machine. These adjustments are manual and time-consuming, and therefore result in a loss of machining time on the machine.

Also, distinct problems arise in engaging small and medium sized workpieces, which cannot be affixed directly to the reference table of the machine in order to fix them in the z-axis. When such workpieces are to be fixed within the horizontal working zone of the machine, errors in positioning often occur, on the z-axis and along angles "A" and "B". Particularly on the z-axis, such positioning errors are difficult and time-consuming to detect by using the measuring devices present on the machine. The consequence is tolerance errors, particularly when the "U"- and "V"-axes of the machine are used for conical machining.

In order to increase the flexibility of these machines, particularly when machining small or medium sized workpieces, and to exploit the possibilities of CNC technology with fixed reference points for the workpiece, with the machine programming then being executable from said points, this type of machine needs to be equipped with a holding system which is flexible to apply and which can accurately fix workpieces of a wide range of sizes (large, medium, and small). Such a holding system should at least define a reference system on the x-, y-, and z-axes, at an angles "A", "B", and "C", which system can be related in a fixed manner to the control system of the machine and can provide the base reference system for said control system.

BRIEF SUMMARY OF THE INVENTION

The object of the present invention is to provide the lacking base reference points on the x- and y-axes and along the angle "C", in an economically optimal manner, and at the same time to preserve the basic accuracy of the reference points of the machine in the z-direction and along angles "A" and "B". The clamping and reference elements introduced according to the invention should be configured such that they also provide clamping elements with sufficient stability that secondary reference systems can be defined within the horizontal working zone of the machine with the aid of selected reference elements.

Particularly on the x-axis and at angle "C", the clamping and reference elements should be disposed outside the horizontal working zone of the machine, in order to ensure maximum freedom of applicability of the machine.

There is one crucial precondition in setting up this holding system with clamping and reference elements on the x- and y-axes and at the angle "C". The reference points introduced on the x- and y-axes must be compatible with the available reference points, so that very importantly the base reference surface in the z-direction will remain accurate, in order to achieve maximum machining accuracy with the machine.

The holding system which is being introduced, comprising clamping and reference elements, should therefore optimally make use of the present stability in the z-direction—the present base reference surface.

Accordingly, the formal underlying object of the invention is to provide a reference system for a wire spark-erosion machine of the above-described type, which system enables exact, reproducible positioning of a workpiece in the working zone, and provides suitable fixed reference values for automatic electronic control of machining carried out on the machine.

In meeting this objective, a reference piece is provided according to the invention which has a planar bottom surface and is provided with fastening means for accurately affixing the piece, by means of its bottom surface to the base reference surface, and which piece further has at least one planar side surface perpendicular to the bottom surface, which side surface serves as a reference surface in the x-direction. Accordingly, an x-reference surface is established near the working zone which enables a workpiece to be installed in a holder outside the machine, or which can serve directly as a direct reference surface against which the workpiece can be buttressed in the machine.

Advantageously, the fastening means comprise parallel through-penetrating holes, and corresponding holes in the base reference surface as fastening means coordinated with the parallel through-penetrating holes, each hole in the base reference surface being aligned with a corresponding through-penetrating hole. Thereby, the reference piece can be accurately fixed to the base reference surface by means of screws or the like. If the through-penetrating holes are arrayed in a straight line and equally spaced, standardized accessory pieces may be used which are applicable on wire spark-erosion machines of a variety of types.

According to an advantageous refinement of the invention, if the extent of the reference piece in the x-direction is appreciably less than the width of the base reference surface in the x-direction, and the fastening means on the reference piece as well as the fastening means on the base reference surface which cooperate with the fastening means on the reference piece are disposed such that a segment of the base reference surface extending in the y-direction is left free, in an x-direction segment ahead of the bottom surface of the reference piece, when the reference piece is affixed to the base reference surface, the said free segment extending in the y-direction may be employed as a z-reference surface for positioning large workpieces, for example.

If, in this connection, segments of the base reference surface extending in the y-direction are left free behind as well as ahead, in the x-direction, of the bottom surface of the reference piece, these two base reference surface segments can serve as z-reference surfaces for the workpiece holders, which holders extend around and form-lockingly engage the reference piece, so that the segments of the base reference surface, which segments are relatively distant from each other in the x-direction, provide secure tilt-stability of the holder in the z-direction, i.e., stability against angular excursions around an axis perpendicular to the z-axis (namely around a line extending in the y-direction).

According to a further advantageous refinement of the invention, the cross-sectional shape of the reference piece is generally a dovetail shape, with which the above-mentioned side surface is formed adjoining the upper surface (which upper surface is wider than the bottom surface), and secondary reference pieces or secondary holding pieces for the workpiece can be used which have matching dovetail-shaped grooves. Secondary pieces are employed with certain known spark-erosion machines. Also, at least one of the oblique surfaces of the dovetail profile can be machined flat, to serve as a reference surface for the secondary holding piece.

In another refinement of the invention, at least one planar end face is provided on the reference piece, as a y-reference surface, which end face extends perpendicularly to the above-mentioned side surface and to the base reference surface. Alternatively, an adjoining piece may be provided which projects above the upper surface and/or the side surface and has a detent surface which detent surface is perpendicular to the side surface and to the base reference surface and serves as a y-reference surface. Advantageously, the adjoining piece is affixed to the end face and rises above the upper surface of the reference piece.

BRIEF DESCRIPTION OF THE DRAWINGS

The invention will be described in detail with reference to the exemplary embodiments illustrated in the accompanying drawings wherein.

DETAILED DESCRIPTION

Figure 1:
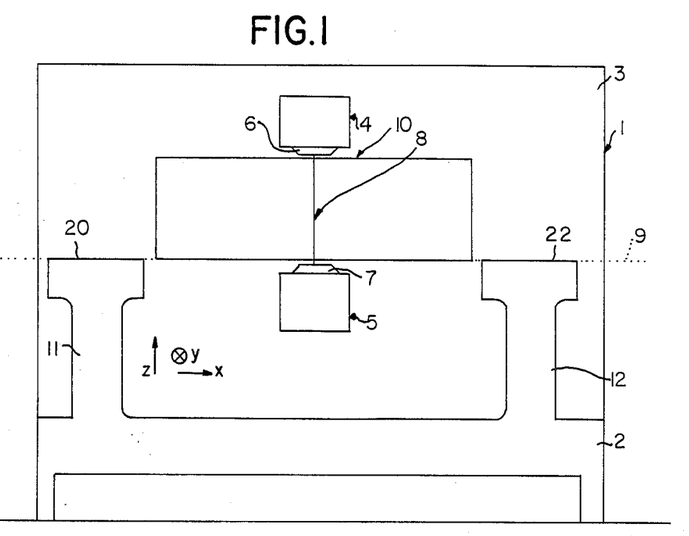
FIG. 1 is a schematic front elevational view of a wire spark-erosion machine in accordance with the invention.
Figure 2:
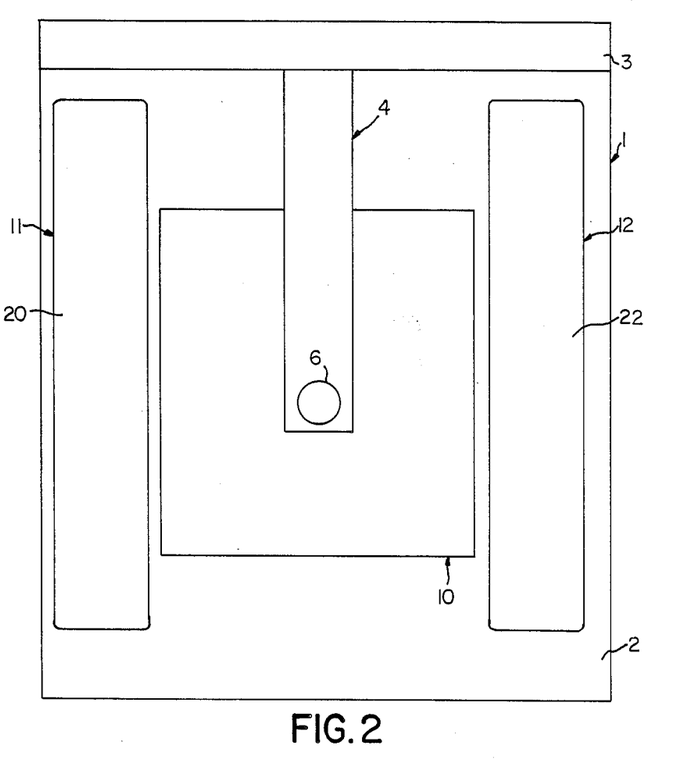
FIG. 2 is a top plan view of the machine of FIG. 1.

A wire spark-erosion machine 1 is shown schematically in FIGS. 1 and 2. It comprises a mounting table 2 and a rear upper part 3. Two parallel arms 4, 5 disposed at a distance apart, extend forward from the upper part 3 and over the mounting table 2. A wire feed mechanism 6 is disposed at the front end of the upper arm 4, and a wire withdrawal mechanism 7 is disposed on the front end of the lower arm 5 opposite the wire feed mechanism 6. The cutting wire 8 of the machine is stretched between the wire feed mechanism 6 and the wire withdrawal mechanism 7. Cutting wire 8 is moved from top to bottom in the vertical z-direction as shown in the embodiment illustrated in FIG. 1.

A computerized numerical control (CNC) system of the machine (not shown) and the drive mechanism (also not shown) for the continuous advance of the cutting wire 8 from the wire feed mechanism 6 to the wire withdrawal mechanism 7 are disposed, e.g., in the upper part 3. The machine also comprises an electrical system, as required for operating on a workpiece by spark-erosion by means of the cutting wire 8, in known fashion. Also present, but not shown, are means for laterally guiding or swinging the cutting wire 8 according to commands from the CNC system, enabling one or more pieces of prescribed geometry to be cut out from a workpiece, in accordance with a program provided in the control system. The working zone 10 (cross-hatched in FIGS. 1, 2, 6, and 7) is a three-dimensional zone within which a workpiece can be spark-eroded by means of the cutting wire 8, by producing relative movement between the workpiece which is being held and the cutting wire 8. The dotted line 9 is the base line delineating the lower limit of the working zone 10 in the z-direction.

Two supports 11, 12 extend upwardly from the mounting table 2. Each support extends along one of the two opposite longitudinal sides of the working zone 10. The following coordinates are shown in FIG. 1: the x-direction, extending from support 11 to the cutting wire, parallel to the base line 9; the y-direction, which extends into the plane of view of FIG. 1; and the z-direction, which extends parallel to cutting wire 8 and perpendicular to base line 9.

The surface of the support 11 is ground flat, in the x-y plane, such that it forms a bottom reference surface 20 (which is the "base reference surface" referred to supra) disposed at the height of the base line 9 and outside of but near the working zone 10. On support 12 which support is parallel to support 11, the corresponding surface is also ground flat in the x-y plane, forming a bottom reference surface 22 disposed at the height of the base line 9 and outside of, but near the working zone 10. One or both of the bottom reference surfaces 20, 22 serves as the z-reference for the positioning of a workpiece in the working zone 10.

Figure 3:
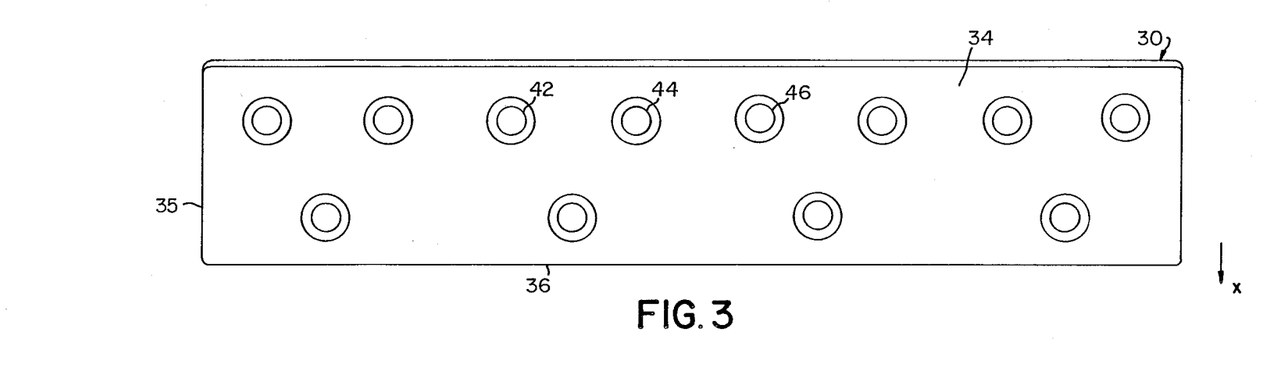
FIG. 3 is a top plan view of a reference piece for use in the wire spark-erosion machine of FIGS. 1 and 2.
Figure 4:
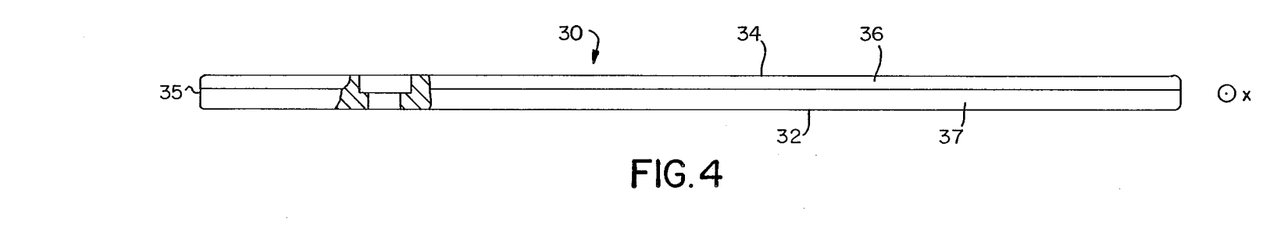
FIG. 4 is a side elevational and partly cross-sectional view of the reference piece shown in FIG. 3.
Figure 5:
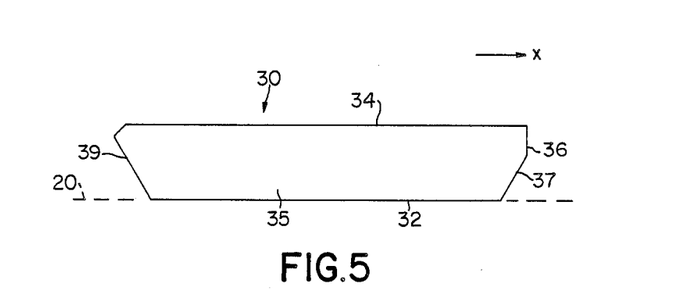
FIG. 5 is a left end elevational view of the reference piece shown in FIG. 3.

Reference pieces 30 (FIGS. 3-5) are affixed with bolts or the like to each of the two bottom reference surfaces 20, 22, with one piece 30 being affixed to each such surface 20, 22. The reference piece comprises a flat, plate-shaped strip comprised of hardened tool steel, with a thickness normal to the bottom surface 32, which thickness is much less than the width or length of the reference piece. The bottom surface 32 is flat and is intended to lie against the bottom reference surface 20 when the reference piece 30 is mounted. The upper surface 34 is parallel to the lower surface 32. The end face 35 extends normally to the bottom surface 32. The cross-sectional area corresponding to the end view (FIG. 5) has a generally dovetail shape, with the upper surface 34 being wider than the bottom surface 32. Reference piece 30 has a side surface 36 adjoining the surface 34, which surface 36 forms a right angle with the bottom surface 32 and with the end face 35, and thus extends in the y-direction when the reference piece 30 is mounted on the bottom reference surface 20. The surface region between the side surface 36 and the bottom surface 32 comprises an inwardly inclined oblique surface 37. A second oblique surface 39 is present on the side of the reference piece 30 opposite side surface 36. Surface 39 is ground flat for use as a reference surface (as will be discussed infra), and extends inward and downward, to the bottom surface 32.

Each reference piece 30 has a plurality of holes passing through it, at least some of which run parallel to each other and are arrayed along a straight line and are equidistant from their respective neighboring holes, e.g., holes 42 and 44, and holes 44 and 46, have the same distance between them. Each of said through-penetrating holes is countersunk from the surface 34, to accommodate the head of a bolt 31, e.g., as shown in FIG. 13.

Figure 13:
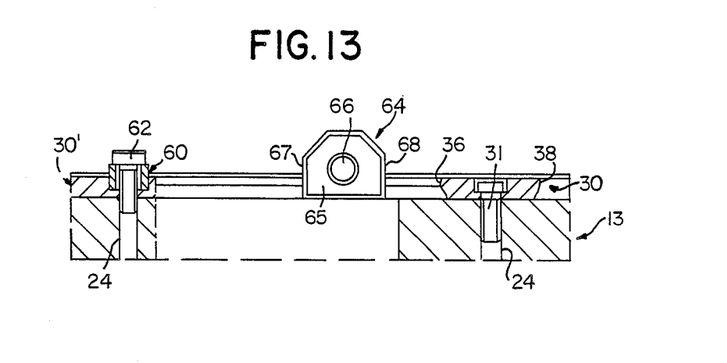
FIG. 13 is a cross-sectional view taken along line XIII—XIII of FIG. 12.

The bottom reference surfaces 20 and 22 are each provided with fastening means, e.g., as shown in FIG. 13, in the form of threaded holes 24 in the respective supports 11, 12 which threaded holes correspond to (in one-to-one fashion) and are perfectly aligned with the through-penetrating holes 42, 44, 46 of the respective reference piece 30. Thereby, the reference piece 30 can be precisely positioned on the respective bottom reference surfaces 20, 22, and can be affixed thereto. The x-direction is indicated in each of FIGS. 3-5. The x-direction is the governing dimension for orienting the reference piece 30 when positioning reference piece 30 on the bottom reference surface 20.

Figure 6:
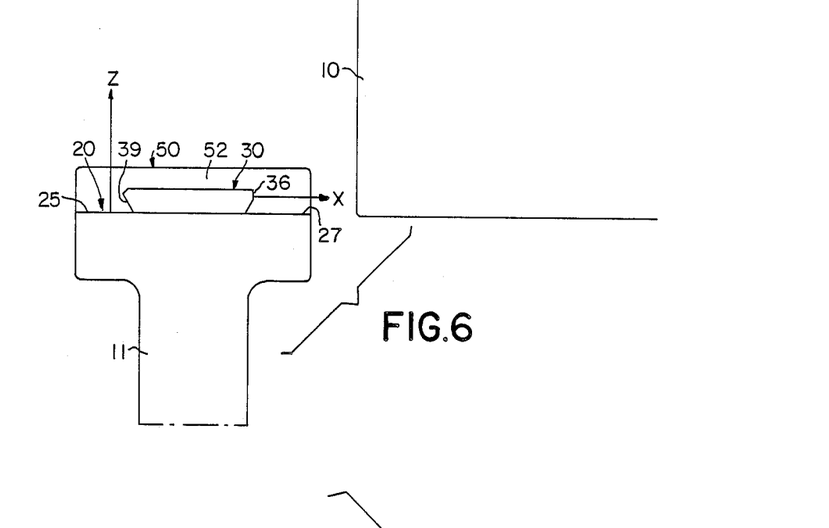
FIG. 6 is a partial end elevational view of the left part of FIG. 1, showing the reference piece installed.

The reference piece 30, when advantageously provided with a row of through-penetrating holes along its middle line, is affixed centrally to the bottom reference surface 20 of the support 11, in the manner described above, so that the longitudinal middle line of piece 30 coincides with the longitudinal middle line of the bottom reference surface 20, as shown in FIG. 6. It is seen from FIG. 6 that the width of reference piece 30 perpendicularly to side 36 (thus in the x-direction) is substantially less than the width of the bottom reference surface 20. When the reference piece 30 is mounted centrally on the bottom reference surface 20, on either side of the reference piece 30 in the x-direction a segment 25, 27, respectively, of the bottom reference surface remains free, each of which segments extends in the y-direction. When reference piece 30 is mounted, there are thus provided an x-reference surface in the form of the side surface 36, and a z-reference surface in the form of the bottom reference segments 25 and 27.

Figure 7:
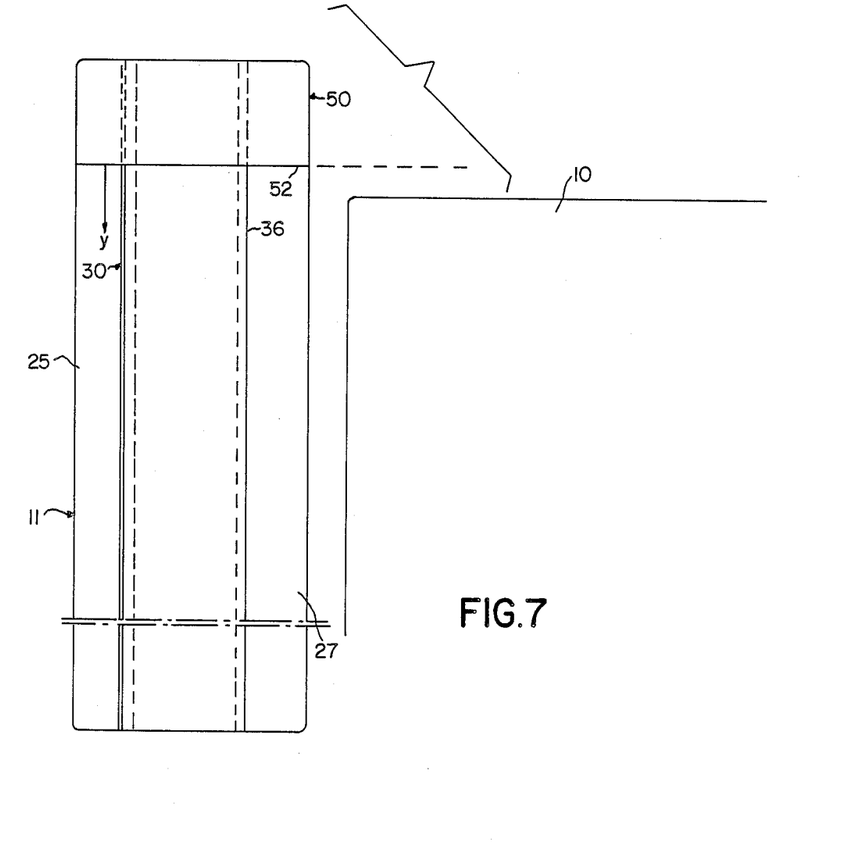
FIG. 7 is a top plan view of FIG. 6, showing the reference piece installed.

In order to provide a y-reference, the reference piece 30 is connected to a block-shaped ajoining piece 50 (FIGS. 6 and 7), at an end face 35 of piece 30. Piece 50 projects sideways and upward, beyond the profile of the reference piece 30. Adjoining piece 50 has a detent surface 52 which extends perpendicularly to side surface 36 and to bottom reference surface 20, and which rests against end face 35. This detent surface 52 forms the y-reference surface, as indicated in FIG. 7. The adjoining piece may be in the form of a small laterally extending strip which is screwed onto the end face 35, with the detent surface of the adjoining piece rising above the surface 34. Alternatively, the adjoining piece may be a sliding piece 64 (FIGS. 12, 13) discussed below.

Figure 10:
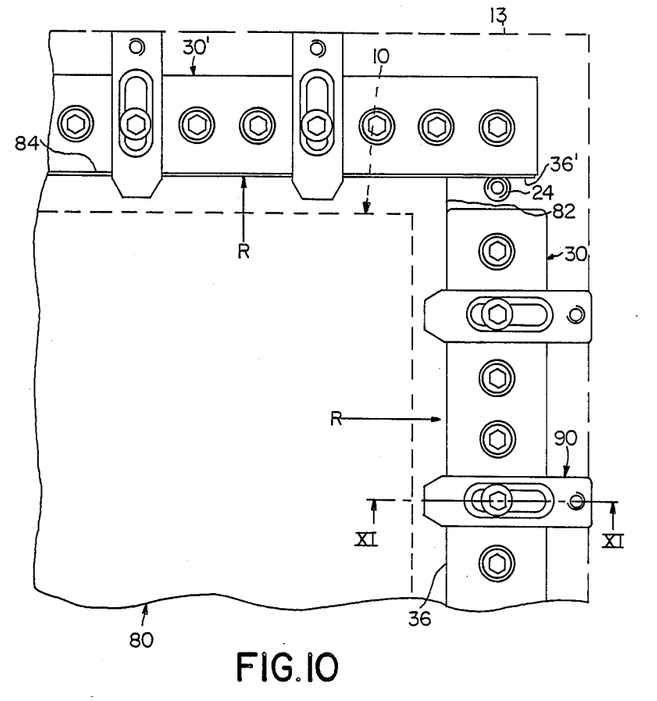
FIG. 10 is a top plan view of part of another embodiment of a wire spark-erosion machine in accordance with the invention.
Figure 11:
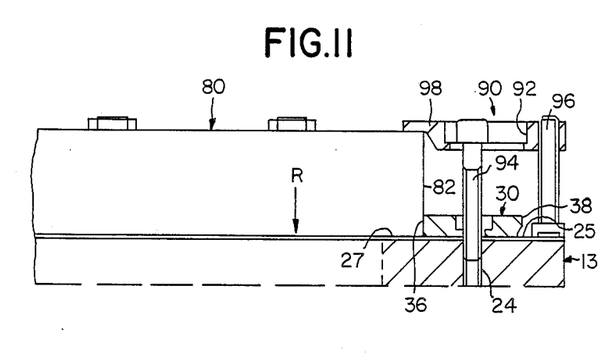
FIG. 11 is a cross-sectional view taken along line XI—XI of FIG. 10.

Bottom reference surface segment 27 may serve to support a relatively large rectangular workpiece block 80 (FIGS. 10-11). Under this arrangement the block is positioned in the machine by placing the block on the bottom reference surface segment 27 in the z-direction, and resting the side surface 82 of the block against the side surface 36 in the x-direction. As thus positioned, the workpiece block 80 can be affixed by a plurality of clamps 90, one of which is shown in cross-section in FIG. 11. Clamp 90 has a longitudinal slot 92 through which a long bolt 94 passes. Bolt 94 also passes through one of the holes in reference piece 30, and the threaded part of bolt 94 is screwed into the associated threaded hole in the support 11. A bracing element 96 holds the end of clamp 90 directed away from the workpiece block 80, maintaining said end at the required spacing from the bottom reference surface segment 25, while the front finger 98 of the clamp 90 extends over the workpiece block 80.

With this positioning of the workpiece block 80, the block is held at clamping points which are in immediate proximity to the working zone 10, which zone is shown as the area outlined by the heavy dash line in FIG. 10, without any of the required holding pieces encroaching on the working zone and reducing the size of the working zone.

The invention is illustrated in FIGS. 10 and 11 on a wire spark-erosion machine in which the support 13 extends in an L-shape, or angled shape, along two adjoining lateral limits of the working zone 10. Accordingly, there is a first reference piece 30 mounted on one leg of the support 13, and a second reference piece 30' mounted on the other leg of the support 13. The reference piece 30' is similar to reference piece 30 in all respects.

If the side surface 82 of workpiece block 80 is pressed against the side surface 36 of reference piece 30, and the adjoining side surface of block 80 is pressed against the side surface 36' of reference piece 30', the workpiece block is then aligned in the machine in the x- and y-directions, since in this application example the side surface 36' is a y-reference surface.

The significance of the oblique surface 39 of the reference piece 30 as an x-reference surface for secondary reference pieces or holding pieces is seen from FIGS. 8, 9, 12, and 13. The reference piece 30 is affixed to the bottom reference surface 20 of the support 11, in the manner described above, so that bottom reference surface segments 25 and 27, respectively, are left free on both sides of reference piece 30. A secondary reference piece 13' (FIG. 9) is comprised basically of an angle piece, one leg of which has a planar bottom surface containing a dovetail-shaped groove. The said bottom surface of secondary reference piece 13' rests on the bottom reference surface segments 25 and 27, while being disposed around the reference piece 30, with the oblique surface 39 of piece 30 form-lockingly, in undercut fashion, engaging the counter-reference surface in the dovetail groove. The secondary reference piece 13' is thus aligned in the x-direction, namely by the positioning of the counter-reference surface of the dovetail groove, which is disposed inside said groove, against the oblique surface 39, and said secondary reference piece 13' is aligned in the z-direction by the resting of the bottom surface of the secondary reference piece 13' on the bottom reference surface segments 25, 27.

Figure 9:
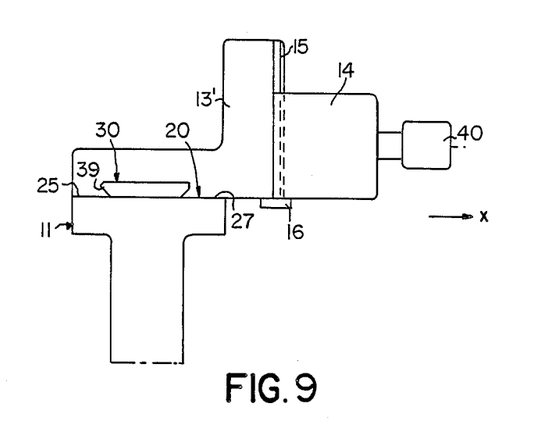
FIG. 9 is a partial end elevational view of the left part of FIG. 1, showing the reference piece and secondary holding parts.

A rail 15 extending in the z-direction is formed on the other, upright leg of the secondary reference piece 13'. A holding piece 14 which is slidable in the z-direction is mounted on said rail. The holding piece 14 may bear devices 40 on its free front side, e.g. hydraulic chuck, wherein an electrode holder with raw electrodes (workpieces) to be worked on (machined by wire spark-erosion) is compressively held, as shown in Federal Republic of Germany Pat. No. 2,646,951. The secondary reference piece 13' further comprises a detent 16 which limits the downward movement of the holding piece 14. The detent surface of the detent 16 is disposed precisely on the base line 9 of the z-direction, thus in the plane of the bottom reference surface segments 25 and 27. It may be seen that in this way the workpiece clamped with the device 40 can be accurately positioned in the x- and z-directions, with the aid of the inventive reference system, by simple adjustment of the position of the secondary reference piece 13' and the holding piece 14 on the reference piece 30.

Figure 8:
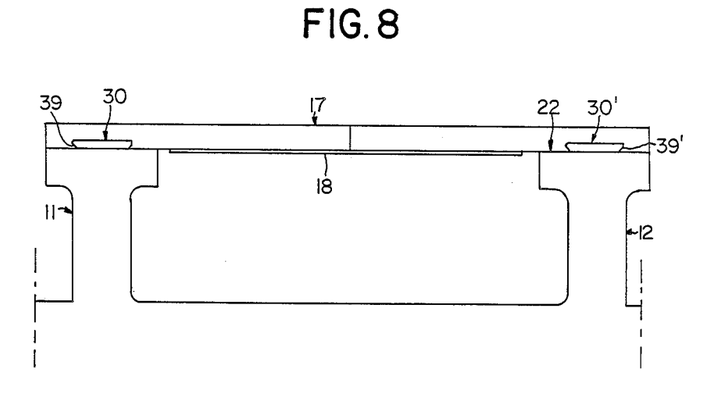
FIG. 8 is a schematic end elevational view of part of FIG. 1, showing the reference pieces and secondary workpiece-holding parts.

Another embodiment is shown in FIG. 8, wherein a secondary holding piece 17 in the form of a bridge is connected to the reference piece 30 and to a similar, second reference piece 30' which is mounted on the second bottom reference surface 22 in the manner described above. The bridge 17 is provided with support strips 18 on its bottom side, whereby a relatively small workpiece can be accurately positioned on such strips 18 in the working zone of the machine. In this embodiment, the oblique surfaces 39 and 39' of the reference pieces 30 and 30', respectively, serve, as discussed previously, as reference surfaces in the x-direction.

The generally dovetail shape of the cross section of the reference piece 30 thus affords the advantage that secondary reference or holding pieces, each provided with a matching dovetail groove in its counter-reference surface, can be readily employed. Such secondary reference and holding pieces are commonly employed with known wire spark-erosion machines having the bottom reference surface below the base line.

Figure 12:
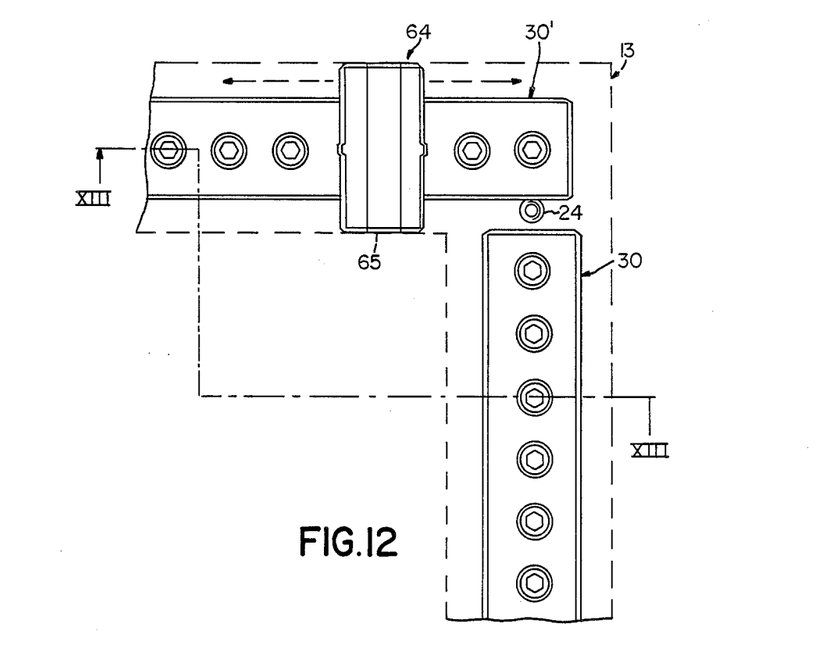
FIG. 12 is a view similar to FIG. 10, with an additional reference piece.

FIGS. 12 and 13 illustrate an additional possible means of providing y-reference on the reference piece 30. A fixed detent 60 may be provided, in the form of a metal bushing, which may be snugly inserted in the widened part of one of the through-penetrating openings 42, 44, 46 of the reference piece 30. The upper part of the bushing extends upward over the surface 34 of the reference piece 30. The bushing is held in place by a bolt 62 which engages a matching threaded hole in the support 13. The external circumference of the upper part of the bushing 60 thus establishes a detent line as a y-direction reference.

Alternatively, a sliding piece 64 can be employed which is slidable on the reference piece 30 and which can be compressively held in position by a set screw 66, at any desired location along the reference piece 30. Each of the opposite side surfaces 67, 68 extending transversely across the longitudinal direction of the reference piece 30 can serve as a y-direction reference surface, in basically the same manner as the detent surface 52 of the adjoining piece 50 of FIGS. 6 and 7. The bottom face of sliding piece 64 is provided with a dovetail groove (not shown), and has counter-reference surfaces to rest on the bottom reference surface segments 25 and 27 and to rest against the oblique surface 39 after the set screw 66 is tightened. One end face 65 of the sliding piece 64 may coincide with the lateral boundary of the working zone 10, thereby forming an x-reference surface.

FIGS. 11–13 also show that the reference piece 30 may have a second side face 38, on its side opposite side face 36, and running parallel to face 36. Such a reference piece has a symmetric cross-section. Accordingly, as needed, one or more of the first side face 36, the second side face 38, the first oblique face 39, and the second oblique face 37 may be employed as x-reference surfaces in the above-described sense.

I claim:

1. In an apparatus for securing a workpiece within a working zone of a wire spark erosion machine including a mounting table having at least one planar base reference surface outside the working zone, the base reference surface having a width extending in an x-direction and a length extending in a y-direction perpendicular to the x-direction, the improvement comprising:

a first reference piece having a planar bottom surface;

means for attaching said first reference piece on the base reference surface with said bottom surface engaging the base reference surface;

the cross-section of said first reference piece in the x-direction having a generally dovetail-shaped profile;

an oblique planar surface on said first reference piece extending in the y-direction to provide a reference surface in the x-direction; and a second reference piece having a planar surface extending in the y-direction and removably attachable to said first reference piece so that said planar surface of said second reference piece engages with said oblique planar surface of said first reference piece;

so that a workpiece may be operatively connected to said second reference piece outside the working zone and then transferred to the working zone together with said second reference piece by attaching said second reference piece to said first reference piece attached to the base reference surface.

2. An apparatus as claimed in claim 1 wherein said means for attaching said first reference piece on the base reference surface comprises:

parallel holes penetrating through said first reference piece; and holes in the base reference surface, each of said holes in the base reference surface being aligned with a corresponding one of said holes penetrating through said first reference piece.

3. An apparatus as claimed in claim 2 wherein:

all said holes penetrating through said piece are arrayed in a straight line.

4. An apparatus as claimed in claim 2 wherein:

said holes penetrating through said piece are equidistantly spaced.

5. An apparatus as claimed in claim 3 wherein:

said holes penetrating through said piece are equidistantly spaced.

6. An apparatus as claimed in claim 1 wherein:

said first reference piece extends in the x-direction a distance substantially less than the width of the base reference surface; and said means for attaching said first reference piece on the base reference surface are disposed so that a segment of the base reference surface are disposed so that a segment of the base reference surface extending in the y-direction is left free in the x-direction between said bottom surface of said first reference piece and the working zone when said first reference piece is attached to the base reference surface.

7. An apparatus as claimed in claim 4 wherein:

said first reference piece extends in the x-direction a distance substantially less than the width of the base reference surface; and said holes are disposed in the base reference surface so that a segment of the base reference surface extending in the y-direction is left free in the x-direction between said bottom surface of said first reference piece and the working zone when said first reference piece is attached to the base reference surface.

8. An apparatus as claimed in claim 6 wherein:

a segment of the base reference surface extending in the y-direction is left free in the x-direction on the side opposite the working zone with reference to said bottom surface of said first reference piece.

9. An apparatus as claimed in claim 1 and further comprising:

at least one planar end face on said first reference piece extending perpendicularly to said oblique planar surface and to the base reference surface for providing a reference surface in the y-direction.

10. An apparatus as claimed in claim 1 and further comprising:

an upper surface on said first reference piece; and an adjoining piece having a detent surface thereon projecting above said upper surface and beyond said dovetail-shaped profile in the x-direction, said detent surfaces being perpendicular to said oblique planar surface and to the base reference surface for providing a reference surface in the y-direction.

11. An apparatus as claimed in claim 1 wherein:

said first reference piece has a flat, elongated shape, the thickness of the reference piece measured perpendicular to said bottom surface being appreciably less than the width and appreciably less than the length of the reference piece.

12. In an apparatus for securing a workpiece within the working zone of a wire spark erosion machine, the machine including a mounting table having at least one planar base reference surface outside the working zone, the base reference surface having a width extending in an x-direction and a length extending in a y-direction perpendicular to the x-direction, the improvement comprising:

a first reference piece having a planar bottom surface;

means for attaching said first reference piece on the base reference surface with said bottom surface engaging the base reference surface;

the cross-section of said first reference piece in the x-direction having a generally dovetail-shaped profile;

an oblique planar surface on said first reference piece extending in the y-direction to provide a first reference surface in the x-direction; and a planar side surface of said first reference piece extending in the y-direction and lying in a plane perpendicular to the plane of said bottom surface of said first reference piece and opposite to said oblique planar surface to provide a second reference surface in the x-direction.

13. An apparatus as claimed in claim 12 and further comprising:

a second side surface on the side of said first reference piece opposite to said at least one planar side surface, said second side surface running parallel to said at least one planar side surface.

14. An apparatus as claimed in claim 12 and further comprising:

an upper surface on said first reference piece; and an adjoining piece having a detent surface thereon projecting above said upper surface and beyond said planar side surface in the x-direction, said detent surface being perpendicular to said planar side surface being perpendicular to said planar side surface and to the base reference surface for providing a reference surface in the y-direction.

15. An apparatus as claimed in claim 14 wherein:

said adjoining piece is affixed to said at least one planar end face.

16. An apparatus as claimed in claim 12 and further comprising:

at least one planar end face on said first reference piece extending perpendicularly to said planar side surface and to the base reference surface for providing a reference surface in the y-direction.

17. An apparatus as claimed in claim 12 wherein:

said first reference piece has a flat, elongated shape, the thickness of the reference piece measured perpendicular to said bottom surface being appreciably less than the width and appreciably less than the length of the reference piece.

18. In an apparatus for securing a workpiece within a working zone of a wire spark erosion machine including a mounting table having at least one planar base reference surface outside the working zone, the base reference surface having a width extending in an x-direction and a length extending in a y-direction perpendicular to the x-direction, the improvement comprising:

a first reference piece having a planar bottom surface;

means for attaching said first reference piece bottom surface to the base reference surface with said bottom surface engaging the base reference surface;

the cross-section of said first reference piece in the x-direction having a generally dovetail-shaped profile;

an oblique planar surface on said first reference piece extending in the y-direction to provide a first reference surface in the x-direction;

a planar side surface extending in the y-direction and lying in a plane perpendicular to the plane of said bottom surface of said first reference piece for providing a second surface in the x-direction; and a second reference piece having a planar surface extending in the y-direction and removably attachable to said first reference piece, said planar surface of said second reference piece being engageable with said oblique planar surface of said first reference piece;

so that a workpiece may be operatively connected to said second reference piece outside the working zone and then transferred to the working zone together with said second reference piece by attaching said second reference piece to said first reference piece attached to the base reference surface.

19. An apparatus as claimed in claim 18 and further comprising:

a second side surface on the side of said first reference piece opposite to said at least one planar side surface, said second side surface running parallel to said at least one planar side surface.

* * * * *